April 24, 1956     A. H. BAER     2,742,768
CONTROL VALVE FOR LIQUID PRESSURE REDUCTION
Filed Feb. 12, 1952
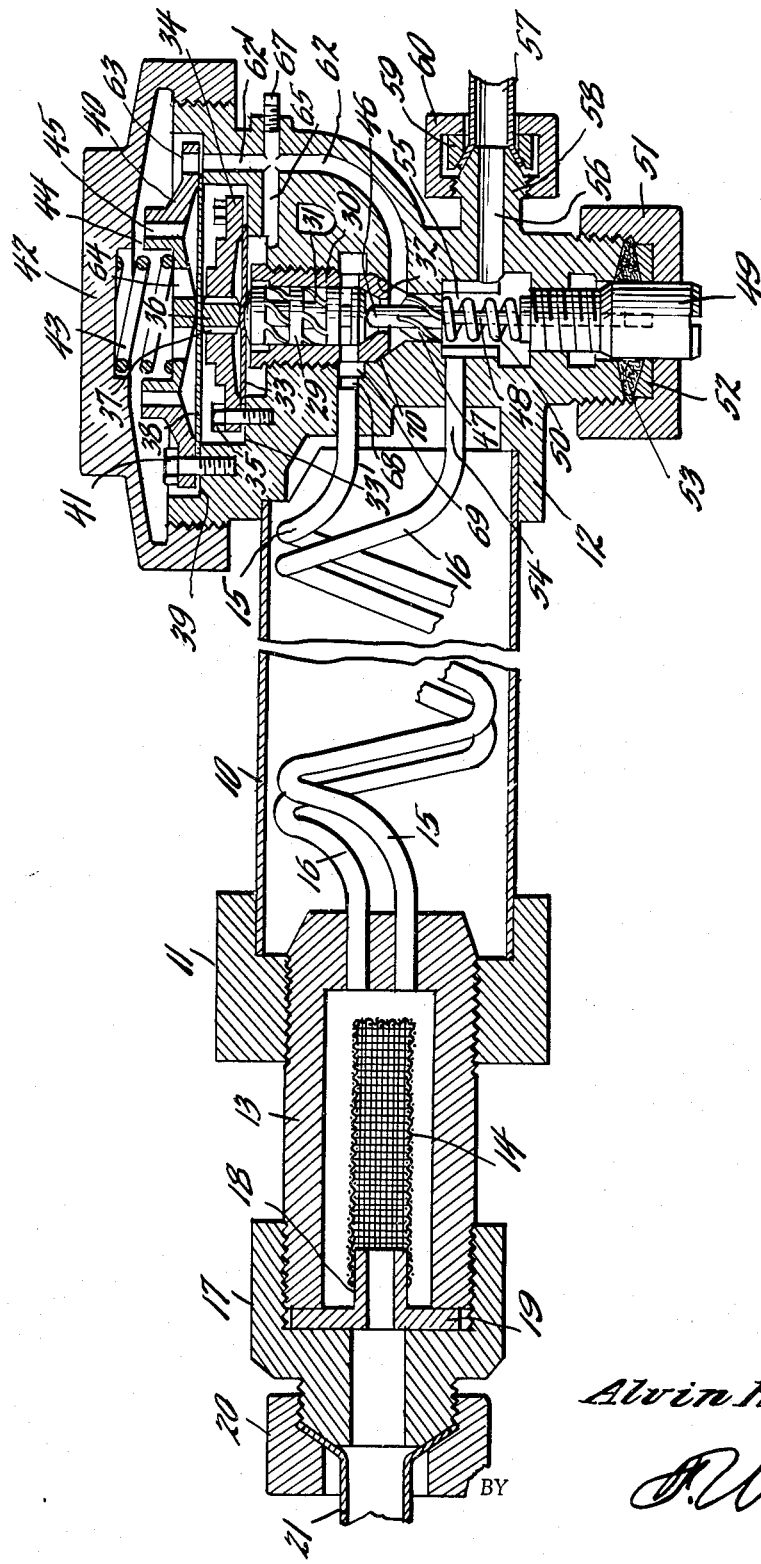
INVENTOR
*Alvin H. Baer*,
BY *F. W. Dahm*
ATTORNEY

United States Patent Office 2,742,768
Patented Apr. 24, 1956

2,742,768

CONTROL VALVE FOR LIQUID PRESSURE REDUCTION

Alvin H. Baer, Camp Hill, Pa.

Application February 12, 1952, Serial No. 271,135

1 Claim. (Cl. 62—127)

My invention relates to liquid pressure reducing means particularly intended for use in refrigerating apparatus of the compressor-condenser-evaporator type, i. e., apparatus wherein pressure is reduced for the purpose of decreasing the temperature of a volatile refrigerating fluid, though not limited to such use. It has been proposed to utilize a so-called capillary tube for that purpose, such a tube being of such small diameter that the pressure of a liquid flowing through the tube is reduced because of the resistance offered by the tube due to its small diameter. Here the pressure is much less at the outlet than at the inlet end, the reduction in pressure varying with the length of the tube and the pressure at its inlet, and the quantity of fluid passing through the tube depending on the diameter of the tube and the ratio of the pressures at the inlet and outlet ends. Such a restrictor tube is disclosed in Pat. No. 1,919,500 to Carpenter.

The usefulness of the Carpenter restrictor tube for control of fluid pressure in refrigerating machinery is limited because of certain deficiencies that are discussed at length in my Patent No. 2,337,862, wherein I have suggested the use of a plurality of restrictor tubes leading from the condenser to the evaporator, at least one of such tubes being what may be called an ever-open tube, wherein the flow may be continuous, it being dependent on such constant factors as the diameter and the length of the tube, though being variable in accordance with inlet and outlet pressures. In another one of said capillary or resistor tubes the flow of refrigerant is intermittent or irregular and is controlled by variation in pressures at opposite ends of the tube. But the flow is never entirely cut off, as by a valve.

The system disclosed in my said patent is adapted for use in many situations for controlling pressures more or less automatically and thus rendering more efficient and reliable the action of various machines employing liquid refrigerant, but it still leaves much to be desired in the way of a more sensitive response of the control when relatively small changes occur in the difference between the evaporator pressure and the pressure that brings the controlling means into action, and it is an object of my invention to provide a control embodying means at the outlet end which means is more closely responsive to changes in the pressure of the fluid passing to the evaporator.

Another object of my invention is to provide controlling means caused to function by the unbalancing of two opposing pressures, each of which pressures is itself a composite of two or more pressures or pushing force.

Still another object is to provide simple and convenient means for varying the upper and lower limits of variations in pressure provided by the control.

Another object is to provide a structure for the control of fluid under pressure wherein a valve is controlled by diaphragms and springs so assembled as not to interfere with the passages for the fluid.

Other objects and advantages will appear upon consideration of the subjoined specification and the drawings annexed thereto, wherein the figure is a central longitudinal section through an embodiment of the control device of my invention.

Referring now to the drawing, which is made a part of this application and in which similar reference characters indicate similar parts, reference character 10 indicates a casing having at its opposite ends casing heads 11 and 12 that are secured to the casing in any suitable manner.

A sleeve 13 is threaded into one end of the hollow head 11, said sleeve containing a tubular filter 14 and having secured in its end wall two restrictor tubes or capillary tubes 15 and 16. A clamping fitting 17 is threaded upon the other end of the sleeve, said fitting holding a flanged fitting 18 on which is mounted the cylindrical filter 14 with its passage coaxial with the cylindrical filter 14 and clamped by means of its radial flange 19 against the end of the sleeve.

A head 20 clamps in place between itself and the flared end of the fitting 17 a tube 21 which is the inlet tube leading from the condenser in a machine of the type indicated.

The head 12 has a centrally located chamber in which a piston type valve 29 is movable longitudinally of a cylindrical sleeve 30 having threaded engagement with the threaded periphery of said central chamber, said sleeve being rotatable by engagement of a screw driver with pockets at the upper end of said sleeve. The valve preferably has spiral guiding ribs 31 and is tapered at its lower end to fit in a seat at 32 on the head 12.

A circular diaphragm 33 is secured to an annular shoulder 33' of the head by cap screws 35 passing through a binder plate 34, the screws being arranged in a circle having a radius equal to the distance from any one of the screws to a center line passing through the longitudinal axes of the valve and various other parts alined therewith, as will appear hereinafter. A pressure transmitting plug 36 is located in a central opening in the cap plate 34, said plug also having outer guide ribs 37 that are preferably spiral and the center line of the plug being alined with that of the valve 29. It will be understood that the spiral form of the guide ribs provides for movement of the parts in a true line without danger of sticking. The plug is rounded at its upper and lower ends for engagement respectively with an upper diaphragm 38 and the lower diaphragm 33. The upper diaphragm 38 rests on an annular shoulder 39 of the head 12, and is secured to said shoulder by means of a binding plate 40 fixed by cap screws 41 arranged in a circle whose radius equals the distance from the center line of any one of said screws to the center line of the valve and plug, above mentioned. It will be seen that diaphragm 33 is considerably smaller than diaphragm 38. Each diaphragm is made of thin laminations as is customary in the art.

An upper cap 42 has threaded engagement with head 12 and is provided with a central recess forming a seat for a non-adjustable coil spring 43 that sits in a spring cup 44. The cup tapers to a rounded point at its lower end where it engages the upper diaphragm, and the spring and cup are alined with the center line previously mentioned.

A pusher 46 is mounted below the valve 29 for movement along the center line of the valve, said pusher having ribs 47 engaging a bore in the head 12 and having a guide stem 48 located in a bore in a plug 49 threaded into a lower opening in said head. A spring 50 surrounds the stem, and said spring bears at one end against the plug 49 and at the other end against a shoulder of the pusher 46. It will be evident that the spring tends to lift the valve from its seat and that the lifting action may be varied by adjustment of the plug 49. A cap 51 is threaded on the head, said cap serving to force a gland 52 against the stuffing box packing at 53 and to close the lower end of the head.

The head 12 includes a passage 54 leading from one of the restrictor tubes, e. g., tube 16, into a chamber 55, thence by way of a passage 56 to a pipe 57 that conducts fluid to the evaporator or other machine being supplied with vaporizable refrigerant, said pipe being secured to a nipple 58 on the head 12 by means of a gland 59 and a clamping nut 60.

In the closed position of valve 29, as shown in the drawing, no fluid can pass the valve because the conical end of the same is seated in the conical end of the valve chamber, but the valve is subjected to three pressures tending to close it. The non-adjustable spring 43 acts through the upper diaphragm and the transmitting member 36 to close the valve. The evaporator pressure acts on the upper face of diaphragm 38, by way of passages 62 and 62', about guide ribs 45 and through holes 64 in spring cup 44. Finally, the evaporator pressure is transmitted through passage 62 and branch passage 65 to the chamber underneath the lower diaphragm, and there becomes effective to some extent to press down upon the upper end of valve 29.

There are also three components of upward pressure tending to open the valve 29. The first is the variable upward pressure of the adjustalbe spring 50. Another is the evaporator pressure by way of passages 62 and 65 to the chamber under the diaphragm 33. Finally, there may be some pressure from the evaporator on the lower end of the valve 29 by way of passage 62 acting directly from chamber 55 through the bore in head 12 that guides pusher 47, and also a small amount of upward pressure in the chamber 55 against the lower end of the pusher 46 and its guiding ribs.

For the efficient functioning of my device it is preferable that the inside of the cylinder 30 and the outer faces of the valve 29 be ground so as to have a good fit and thus to control most effectively the vapor pressure that builds up in the tube 15 and in the spaces 68, 69 while the valve is closed. In order to provide the small amount of lubrication that is desirable an impregnated grease paste may be pressed closely into the spaces between the ribs 31. The outer end of branch passage 65, necessary for drilling, is closed by plug 67.

The operation of the control is as follows: Liquid will, normally flow through restricted tube 54, following conduits 54, 55, 56 and 57 to the evaporator of the refrigerating plant. When the cooling work being done in the evaporator exceeds the amount of liquid supply flowing through this path there will be a gradual falling of the evaporator pressure, provided, of course, that the refrigerating compressor capacity is of the right amount, and is balanced with the evaporator, as is always presumed for a properly built plant. At this time the control valve must operate to open piston valve 29 and allow a quantity of refrigerating liquid (vapor) to flow from intermittent tube 15, through the spaces 68 and 69, the channels between ribs 47, and into chamber 55, where the incoming fluid mingles with that from conduit 16. Thus, the evaporator is always supplied with the quantity of refrigerant that it requires. Conversely, the supply of refrigerant is reduced by the closing of piston valve 29 when there is no need for a full supply. It is also true that when a refrigerating plant is not evenly balanced and, for example, the refrigerating compressor is not able to take away the total amount of evaporated gas at times, the supply will be reduced by means of the closing of piston valve 29 and thus prevent an elevation of the cooling temperature of the plant beyond that permissible. Such elevation of temperature would, of course, occur when the evaporator pressure was elevated by reason of too much evaporation.

The operation of piston valve 29 is as follows: The entire control valve is designed so that the non-adjustable spring 43, the larger size diaphragm 38, the smaller size diaphragm 33, the piston valve 29 and the adjustable spring 50, along with their associated parts are of proper size and materials. These these will vary in control valves that are made for refrigerating plants that operate under widely differing conditions. Let it be assumed that the non-adjustable spring will exert a total pressure of four pounds when in the closed position. Likewise, that the larger diaphragm is three inches in diameter and the small one is one and one-half inches in diameter, and the adjustable spring exerts a total pressure in the closed position of ninety-eight and four-tenths pounds gauge. These assumptions are made with the thought that the average evaporator pressure is desired to be at fifteen pounds gauge.

Now the evaporator pressure is communicated to the larger diaphragm 38 through passage 62, opening 63 and openings 45 and 64 in parts 40 and 64, respectively. It presses on the upper side only of said diaphragm, i. e., it is a downward pressure. It also presses against the under side of the smaller diaphragm through passages 62 and 65 with an upward pressure. Thus the two diaphragms are pressed toward each other and must move in unison because of the transmitting plug 36 which moves freely in binder plate 34. Then there is also downward pressure against the upper head of the piston valve 29 (the actual opening and closing element of the control) and there is upward pressure against the under side of the lower head of this piston valve. It will be noticed that the upper part of the piston valve is larger than the lower part which provides a definite stop for the closing movement of the valve. The upper head is rounded and substantially all of its area will be affected by the evaporator pressure. Likewise, the upper end of the pusher 46 is rounded where it contacts the lower end of the valve and this, together with a loose fit of stem 20 will permit the evaporator pressure to affect substantially all of the lower valve head, i. e., the upward and downward pressures on the respective end faces of valve 29 are nearly equal.

Now let it be assumed that the adjustable spring is set so that all upward pressures will balance all the downward pressures when the evaporator pressure is at fifteen pounds gauge. This means that the piston valve 29 will remain closed against its stop seat at 70 and no refrigerant fluid will flow through tube 15, tube 16 being now the only source of supply of fluid. If tube 16 does not furnish enough refrigerant for the capacity of the plant the evaporator pressure will drop and by reason of the greater area of the surfaces subjected to downward pressure the effect of the reduction in pressure will be greatest upon them and will produce an imbalance such that the spring 50 will soon be able to push the valve 29 upward and admit more refrigerant from tube 15. This in turn will soon build up the pressure in the evaporator to a point above fifteen pounds gauge and then the imbalance will be reversed, the larger diaphragm together with all other downward pressing areas closing the valve 29 against its seat and thus stopping the flow through pipe 15 until the pressure in the evaporator falls again, the flow through pipe 15 thus being an intermittent flow.

If there is to be a higher, or a lower, average evaporator pressure maintained in order to obtain a different working temperature for the plant, the threaded plug 49 may be adjusted upward or downward to change the total of the upward pressures to another point and the evaporator will then affect (that is, move to open and close) the piston valve when the pressure for which the adjustment has been made is exceeded or falls too low. In addition to this adjustment there may be a substitution of springs having a different tension when the desired working temperature (and pressure) of the plant is widely different from the fifteen pounds for which I have assumed conditions. In other words, when a control is made and adjusted for a given range of evaporator pressures and a widely different average evaporator pressure is desired, the user has the option of substituting springs of a different tension. To illustrate more clearly how the fifteen pounds average pressure functions there is shown a tabulation.

|  | Evaporator Pressures | | |
|---|---|---|---|
|  | 14 lb. Gauge | 15 lb. Gauge | 16 lb. Gauge |
| Composite pressure downward: | lb. | lb. | lb. |
| Non-adjust. Spring | 4.000 | 4.000 | 4.000 |
| Larger diaphragm | 98.950 | 106.000 | 113.880 |
| Upper Valve Head | 38.660 | 41.415 | 44.180 |
| Total downward | 141.610 | 151.415 | 162.060 |
| Composite pressure upward: | | | |
| Adjustable Spring | 98.405 | 98.405 | 98.405 |
| Smaller Diaphragm | 24.730 | 26.505 | 28.270 |
| Lower Valve Head | 24.730 | 26.505 | 28.270 |
| Total upward | 147.865 | 151.415 | 154.845 |

Thus it is seen that when the control is adjusted so that it balances the upward total pressures and the downward total pressures at an evaporator pressure of fifteen pounds gauge there will be an imbalance of 6.255 lb. in favor of the upward pressing elements if the evaporator pressure drops to 14.000 lb. Also there will be an imbalance of 9.215 lb. in favor of the downward pressing elements if the evaporator pressure rises to 16.000 lb.

This device will be required to meet pressure conditions that are widely different, due to the increasing application of refrigeration to more uses and more widely varying temperature-pressure conditions. Moreover, the average temperature-pressure conditions include, in many cases, conditions that vary a great deal. It will undoubtedly be to the advantage of the user to be provided with devices of this type having tubes of the following sizes, or multiples, (a) one type having tubes 15 and 16 of the same size for use in the average arrangement of compressor-condenser-evaporator class of refrigerating plant, (b) another type having tube 15 small and tube 16 large, or in multiple of the same size, for use in a refrigerating plant where the cooling load is almost constant and variation of the cooling load usually small, so as to reduce the functioning of the control of tube 15 (the cycling) to the minimum and by increasing uniformity of operation obtain a more efficient refrigerating plant, (c) still another type having tube 15 large or in multiple of the same size and tube 16 small, for use in a plant where the plant load varies widely and the compressors, in many cases, have automatic capacity control that reduces their capacity to a small part of the normal, so as to provide greater efficiency of the plant through a quicker change of pressures when the compressor capacity changes and the control has to function as a follow-up.

Other kinds of refrigerating loads will likewise be served by a device of this type having other sizes and multiples of tubes 15 and 16 when the user requires this service. The purpose is to provide a control that may be adapted to the many temperature-pressure conditions that are needful while providing operation of the combined compressor-condenser-evaporator plant at its efficiency for the situation, the most nearly uniform temperature-pressure condition for a load that is nearly uniform, the quickest responses to pressure changes for a plant that has sudden and wide changes of pressure due to compressor capacity unloading, or other variations, such as a refrigerating plant where there are intermittent and wide changes of the refrigerating load by the additions of large quantities of warm materials from time to time.

Whether a larger size tube is used, or substituted for either of the tubes 15 or 16, or whether a multiple of the same size tube is used when unequal flow capacities are desirable, will depend on the predominating preferences of users, on the limits applying to the material supply market, as it is at present, and to some extent, on the manufacturing facilities and cost that are material limitations at the time.

It will be obvious to those skilled in the art that my device may be modified in various ways and may be used in other situations and for other purposes than to control an evaporator in a refrigerator, all without departing from the spirit of the invention; and therefore I do not limit myself to what is shown in the drawings and described in the specification, but only as indicated in the appended claim.

Having thus fully described my invention, what I claim is:

In a refrigerating apparatus of the type that successively compresses, condenses, expands and evaporates a volatile fluid refrigerant, said apparatus including a plurality of restrictor tubes, at least one of which is open to permit fluid to pass to the evaporator continuously and at least one other of which operates intermittently, the combination of a casing for the last-named tube, and further including a control device including a reciprocating piston type valve and actuating means for the valve, said actuating means comprising a larger and a smaller diaphragm concentric with the valve, both of said diaphragms being in constant contacting communication with the valve, both of said diaphragms being secured to the control device casing, spaced from each other and with the larger diaphragm positioned above the smaller diaphragm, a pressure transmitting plug positioning between the two diaphragms, said two diaphragms and the plug forming a closed cell whereby the two diaphragms operate in unison, non-adjustable spring means coacting with the larger diaphragm to close said valve when the pressure in the evaporator rises above a predetermined point, and adjustable resilient means acting to open the valve when the pressure in the evaporator falls below a predetermined point.

References Cited in the file of this patent

UNITED STATES PATENTS

| 1,853,273 | Hoffman | Apr. 12, 1932 |
| 2,016,234 | Hughes | Oct. 1, 1935 |
| 2,224,377 | Clark | Dec. 10, 1940 |
| 2,337,862 | Baer | Dec. 28, 1943 |
| 2,497,677 | Lathrop | Feb. 14, 1950 |
| 2,505,933 | Aughey | May 2, 1950 |
| 2,521,637 | Lack | Sept. 5, 1950 |
| 2,558,930 | Carter | July 3, 1951 |